United States Patent
Beach et al.

(10) Patent No.: US 12,024,292 B2
(45) Date of Patent: Jul. 2, 2024

(54) DUAL CHANNEL RINSE RING SYSTEM FOR TOILET

(71) Applicant: MAG Aerospace Industries, LLC, Carson, CA (US)

(72) Inventors: David Beach, Los Alamitos, CA (US); Jean Gayoso, Los Angeles, CA (US); Razmik Boodaghians, Glendale, CA (US); Steven Schwartz, Long Beach, CA (US); Peter Kazemi, Irvine, CA (US); Nguyen Tram, Chino Hills, CA (US)

(73) Assignee: MAG Aerospace Industries, LLC, Carson, CA (US)

( * ) Notice: Subject to any disclaimer, the term of this patent is extended or adjusted under 35 U.S.C. 154(b) by 0 days.

(21) Appl. No.: 17/775,862

(22) PCT Filed: Nov. 12, 2020

(86) PCT No.: PCT/US2020/060140
§ 371 (c)(1),
(2) Date: May 10, 2022

(87) PCT Pub. No.: WO2021/097030
PCT Pub. Date: May 20, 2021

(65) Prior Publication Data
US 2022/0388663 A1 Dec. 8, 2022

Related U.S. Application Data (60) Provisional application No. 62/934,468, filed on Nov. 12, 2019.

(51) Int. Cl.
*B64D 11/02* (2006.01)
*E03D 11/17* (2006.01)

(52) U.S. Cl.
CPC ............. *B64D 11/02* (2013.01); *E03D 11/17* (2013.01); *E03D 2201/40* (2013.01)

(58) Field of Classification Search
CPC ..... B64D 11/02; E03D 11/17; E03D 2201/40; E03D 5/003
(Continued)

(56) References Cited

U.S. PATENT DOCUMENTS 1,215,049 A * 2/1917 Muckenhirn ........... E03D 11/02
4/421
2,094,302 A * 9/1937 Priess ....................... E03D 5/04
4/216
(Continued)

FOREIGN PATENT DOCUMENTS

| JP | H05311718 A | * 11/1993 | ............... E03D 1/01 |
| JP | H05311718 A | 11/1993 | |
| WO | 2019/083545 A1 | 5/2019 | |

OTHER PUBLICATIONS

JPH05311718A Machine Translation (Year: 2023).*
(Continued)

*Primary Examiner* — David P Angwin
*Assistant Examiner* — William R Klotz
(74) *Attorney, Agent, or Firm* — Kilpatrick Townsend & Stockton LLP (57) ABSTRACT

A rinse ring system for use on a toilet. The rinse ring is a dual channel rinse ring, which allows the toilet to be flushed with either potable water from a fresh water system or with grey water from a grey water source. Other flush fluids are possible for use. The dual channel rinse ring provides separation between entry points for potable water rinse and the grey water rinse, preventing the possibility of contamination of the potable water source with grey water.

11 Claims, 5 Drawing Sheets

(58) Field of Classification Search
USPC .............................................. 4/420, 223, 346
See application file for complete search history.

(56) References Cited

U.S. PATENT DOCUMENTS

| | | | | |
|---|---|---|---|---|
| 2,858,939 | A * | 11/1958 | Corliss .................... | B64D 1/16 |
| | | | | 210/138 |
| 4,183,105 | A * | 1/1980 | Womack ................. | E03D 9/005 |
| | | | | 4/300 |
| 4,197,598 | A * | 4/1980 | Lemmon ............... | E03D 11/025 |
| | | | | 4/341 |
| 5,084,920 | A | 2/1992 | Kimball | |
| 5,301,374 | A * | 4/1994 | Smiley .................. | E03D 11/025 |
| | | | | 4/341 |
| 6,019,862 | A * | 2/2000 | Cardwell .............. | C04B 37/001 |
| | | | | 264/633 |
| 8,756,722 | B2 * | 6/2014 | Inglin .................... | E03D 11/02 |
| | | | | 4/421 |
| 2001/0034902 | A1 | 11/2001 | Tyler | |
| 2016/0251841 | A1 * | 9/2016 | Huynh ..................... | E03D 3/12 |
| | | | | 4/324 |
| 2017/0226726 | A1 | 8/2017 | Schless | |
| 2018/0238038 | A1 | 8/2018 | Pomeroy et al. | |
| 2020/0277773 | A1 * | 9/2020 | Lorenzo ................ | E03D 11/025 |

OTHER PUBLICATIONS

International Patent Application No. PCT/US2020/060140, International Search Report and Written Opinion, dated Feb. 5, 2021.
Europe Appl. No. 20824724.7, Office Action, Feb. 12, 2024, 4 pages.

* cited by examiner

DUAL CHANNEL RINSE RING SYSTEM FOR TOILET

This application claims the benefit of U.S. Provisional Application Ser. No. 62/934,468, filed Nov. 12, 2019 titled "Dual Channel Rinse Ring for Toilet," the entire contents of which are hereby incorporated by reference.

FIELD OF THE DISCLOSURE

According to certain embodiments of this disclosure, there is provided a rinse ring system for use on a toilet. The rinse ring is a dual channel rinse ring, which allows the toilet to be flushed with either potable water from a fresh water system or with grey water from a grey water source. Other flush fluids are possible for use. The dual channel rinse ring provides separation between entry points for potable water rinse and the grey water rinse, preventing the possibility of contamination of the potable water source with grey water.

BACKGROUND

Many types of passenger transport vehicles (such as aircraft, ships, buses, trains, and any other passenger transportation vehicles) use vacuum toilets in order to flush septic waste, which is then delivered to a septic holding tank on board the vehicle. The vacuum created for the flushing action may either be via one or more vacuum pumps, or, in the case of an aircraft in flight, via a pressure differential. For example, aircraft typically have a vacuum disposal system that applies a vacuum to pull waste media and flush water/spent water from toilets and/or sinks into an on-board waste storage tank. The suction is generated either by the pressure differential between the pressurized cabin and the reduced pressure outside of an aircraft at high flight altitudes or by a vacuum generator at ground level or at low flight altitudes.

Flush water for on-board toilets is typically delivered from an on-board fresh water supply held in a fresh water tank, generally referred to as potable water or a potable water tank. However, fresh water is an expensive resource to store aboard passenger transport vehicles, such as aircraft, due to water's high density and large volume of consumption on flights, especially international flights. In addition to needing fresh/potable water for flushing vacuum toilets, passenger lavatories also use fresh/potable water for hand washing in lavatory sinks. For example, on-board a B777 sized aircraft tasked with a 10 hour mission, passenger use of potable water from sink faucets for hand-washing can account for around 135 gallons of water pouring down lavatory sinks each flight, which accounts for about 40% of in-flight water consumption. Without recycling, this water is unused and wasted.

This used water is generally referred to as "grey water," which refers to water that has been soiled but that does not contain sewage or "black water." Grey water is the spent or used water that has been used for hand-washing or that is otherwise poured down a sink, and may contain contaminants such as soaps or other detergents. In addition to hand-washing water overflow from the lavatory, grey water can also include water from galley sinks. Fluids from the galley can contain items such as leftover portions of beverages and water from melting ice, or any other form of "used" or spent water that drains from the water system. Grey water can also drain from wash basins during hand washing, or any other instance in which water is soiled or loaded with waste, such as e.g., soaps, detergents, soils from hand washing, and so forth. Lavatory and galley sinks are typically connected to small diameter drain lines (which can easily back up if clogged) and may either terminate at the aircraft drain mast for exhaustion to the atmosphere or may be delivered to a grey water holding tank. It is also possible to direct the grey water to an onboard septic tank, such that grey water and black water are stored collectively as waste and can be pumped out of the septic tank after the flight.

Various attempts at reusing, filtering, and managing grey water on board vehicles have been explored. The present assignee has sought to develop a number of ways that grey water can be captured, filtered, and re-used on board the aircraft or other vehicle. Examples of solutions identified by the present assignee are outlined and described in various U.S. patents, including but not limited to U.S. Pat. No. 9,458,028 (titled "Mixed Fluid Filtration System"); U.S. Pat. No. 9,540,107 (titled "Systems and Methods for Treating Grey Water On-board Passenger Transport Vehicles"); U.S. Pat. No. 9,718,549 (titled "Grey Water Interface Valve Liquid Level Sensor System"); U.S. Pat. No. 9,701,410 ("Two-Stage Flush And Grey Water Flush Systems And Devices"); U.S. Pat. No. 1,021,428 ("Two-Stage Flush And Grey Water Flush Systems And Devices"); U.S. Pat. No. 9,902,497 ("Method And System For Managing The Grey Water In An Aircraft"); U.S. Pat. No. 9,089,635 ("Apparatus And Method For Modifying Pressure-Flow Characteristics Of A Pump"); U.S. Pat. No. 10,308,361 ("Disposable Modular Reservoir"); and PCT application PCT/US2020/047372, titled "Fluid Recycling Unit For Aircraft". The entire contents of each of these patents and applications are incorporated herein by this reference.

Recycling grey water can benefit airlines in many capacities. For example, it can reduce the overall consumption of water; it can reduce the mass of the water required to be carried per flight, which could generate the ability to carry alternate payload instead of water; and it can allow the airline to tout itself as environmentally-friendly and as interested in conservation of resources. Some of the above applications have focused on filtering/treating grey water. Some of the above applications have focused on designing pumps and reservoirs for capturing the grey water and delivering it to a toilet for use as flush water. Some of the above applications have focused on preventing contamination issues—if grey water is delivered to an onboard septic tank storing black water, it is necessary to ensure that the black water cannot back flow into a lavatory or galley sink in the event of a sink clog.

Although vacuum toilets use much less water than a typical gravity flow toilet, it is still desirable to find a way to re-use the spent/grey water rather than using fresh water for each flush cycle, due to cost and weight considerations of maintaining fresh water on-board. Thus, additional improvements to using grey water for toilet flushing are desirable and necessary.

SUMMARY

Generally, the present assignee has found that it can reduce the weight of each flight by significant amounts by re-using spent/grey water for toilet flushing or other uses. When grey water is re-used in connection with a toilet flush system, it has been found necessary to ensure that if insufficient grey water is available for toilet flushing, potable/fresh water may be used instead. It is also necessary to prevent any contamination of the potable/fresh water source by the grey water used, when the toilet system is switching between different types of water used for flushing. Accordingly, the present disclosure provides a dual channel rinse ring. One channel is specified for receiving and delivering freshwater, and a second channel is specified for receiving and delivering grey water. Other flush fluids are also possible for use.

The terms "invention," "the invention," "this invention" "the present invention," "disclosure," "the disclosure," and "the present disclosure," used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

DETAILED DESCRIPTION

Embodiments of the present disclosure provide a dual channel rinse ring. The dual channel rinse ring provides a separation between potable rinse water and grey rinse water. This prevents the need for other separation features to ensure that the grey water does not contact the potable water or the potable water entry valve. This is necessary because if the potable and grey water are allowed to mix, back flow, or if there is otherwise contact between the grey water and the potable water valve, grey water could contaminate the entire potable water supply.

Figure 1:
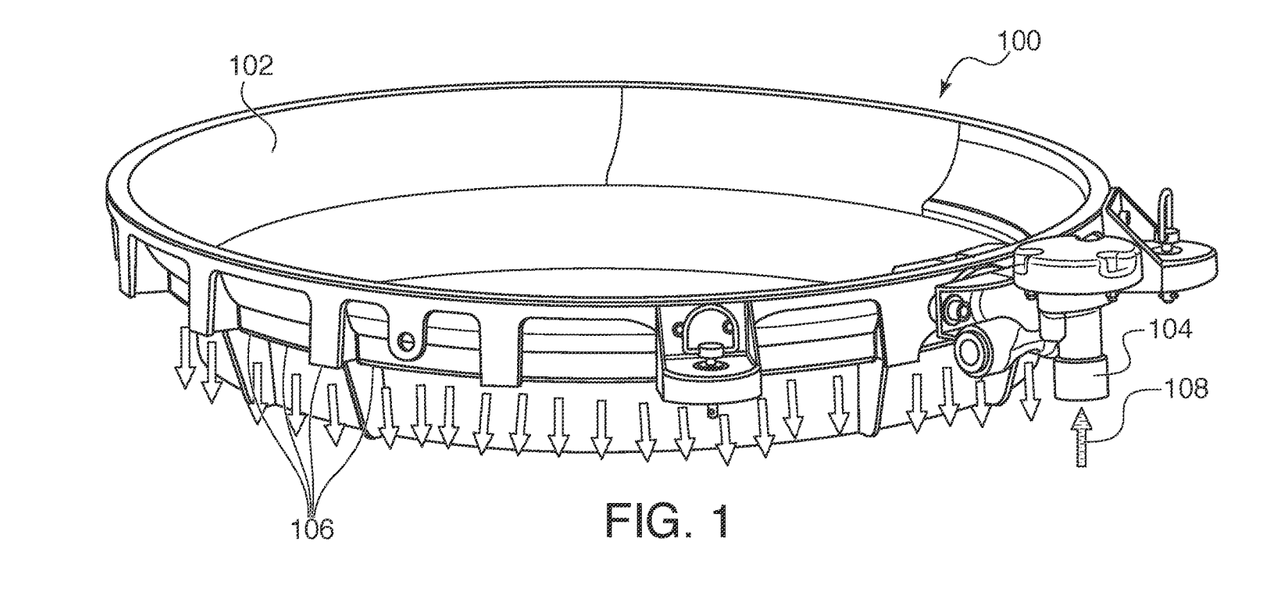
FIG. 1 shows a side perspective view of a prior art rinse ring.
Figure 2:
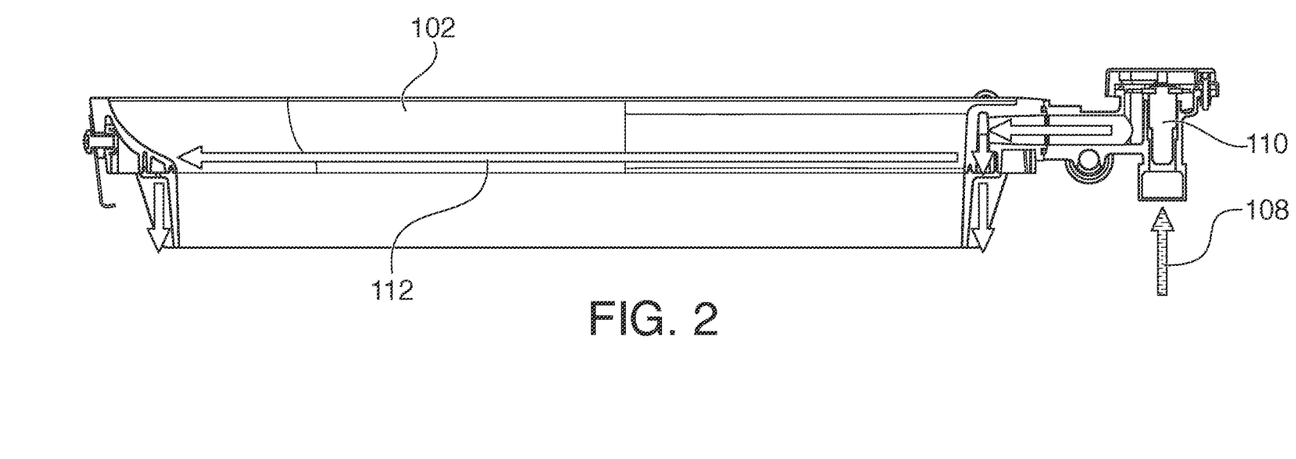
FIG. 2 shows a side plan view of the rinse ring of FIG. 1.

As background, FIGS. 1 and 2 show a traditional rinse ring system 100 that delivers potable water for toilet flushing. The traditional rinse ring system 100 has a rinse ring body 102, a potable water inlet 104, and a plurality of openings 106 that are configured to deliver potable rinse water rinse water into a toilet bowl. FIG. 1 shows a side perspective view with an arrow 108 indicating water entering potable water inlet 104. FIG. 2 shows a side cross-sectional view, illustrating potable water anti-siphon valve 110, which functions as a check valve. As water enters the rinse ring system 100, pressure from the pressurized water system forces water past the valve 110, causing the valve 110 to raise and allow water to pass. The water moves along a rinse ring channel 112 and is dispersed/forced out openings 106.

However, with new technology that seeks to allow use of grey water for toilet flushing, it is necessary to provide a rinse ring system that can accommodate both types of water, fresh water from the potable water system, as well as grey water from a grey water reservoir, filter system, or some other onboard system that collects and/or treats grey water prior to its use for flushing water. It is generally desirable to allow the toilet to receive both types of water for flushing, because there may be instances when grey water is not available. For example, at the beginning of a flight, a passenger using the lavatory may not have yet washed his or her hands, so no grey water has accumulated in the reservoir. In this instance, it is necessary for fresh/potable water to be used for toilet flushing. However, once a sufficient amount of grey water has accumulated and been appropriately treated, is desirable to use the grey water for toilet flushing. However, the ability to switch back and forth between these different water qualities present a challenge with using the traditional rinse ring system 100. If grey water is delivered into the inlet 104, it will contact the valve 110. Contact of valve 110 with water that is not of potable water quality has the potential to contaminate the potable water supply. Additionally, allowing grey water to contact the channel 112 could also create a problem if backflow were to occur. Water (or whatever rinse fluid is used) is still under pressure while in the rinse ring, and if the two different flush fluids are not kept separate from one another until exiting the rinse ring at openings of the rinse ring, contamination of the potable/fresh water supply may occur. There are federal regulations that define water quality standards, and put simply, they do not allow "dirty" or grey water to mix with or contact the potable water supply. In order to prevent such contamination, the present disclosure provides a dual channel rinse ring system 10.

Figure 3:
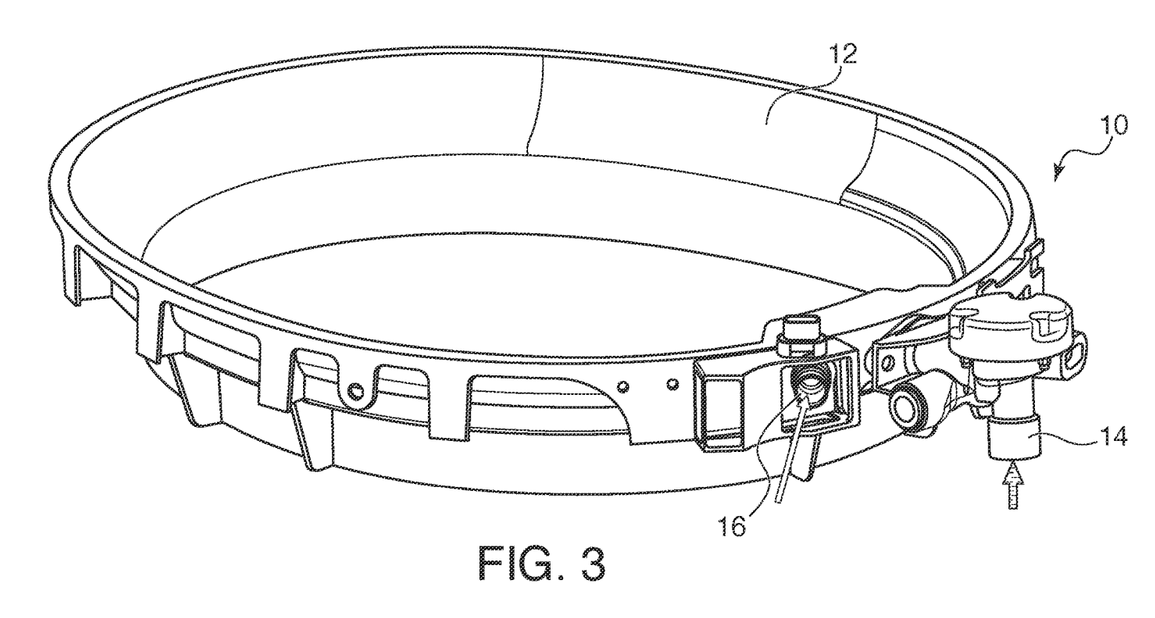
FIG. 3 shows a side perspective view of a dual channel rinse ring system.
Figure 4:
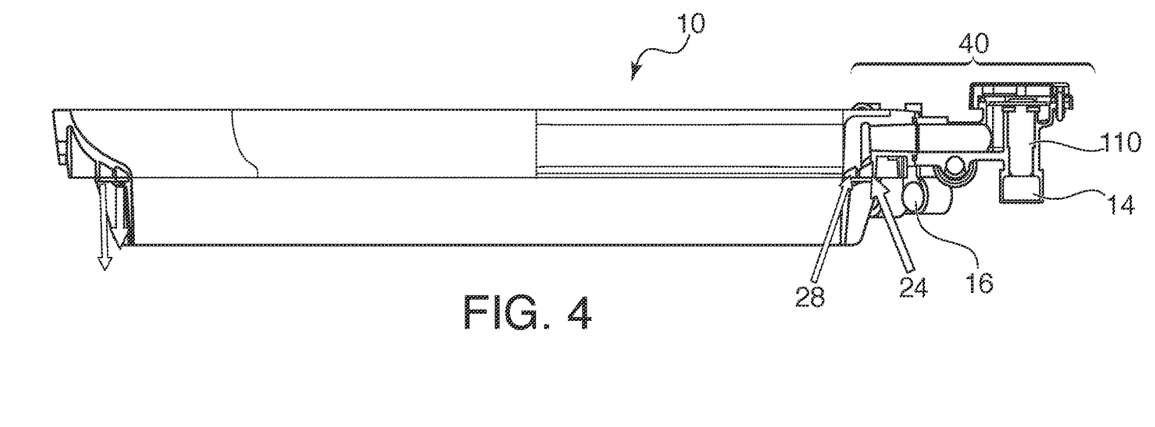
FIG. 4 shows a side plan view of the dual channel rinse ring system of FIG. 3.

FIGS. 3-7 illustrate one embodiment of a dual channel rinse ring system 10. The dual channel rinse ring system includes a first flush fluid delivery system and a second flush fluid delivery system. As shown by FIG. 3, the rinse ring body 12 is provided with first and second inlets 14, 16. A first inlet 14 functions as a first flush fluid inlet. In this disclosure, the first flush fluid is generally potable water (but it should be understood that a different fluid may function as the first flush fluid.) A second inlet 16 functions as a second flush fluid inlet. In this disclosure, the second flush fluid is generally grey water (but it should be understood that a different fluid may function as the second flush fluid). Various options of different flush fluid are described further below. Providing separate inlets 14, 16 prevents grey water from ever contacting the potable water anti-siphon valve 110. FIG. 4 illustrates a side cross-sectional view showing second inlet 16. This figure also illustrates that the grey water exits the rinse ring body 12 at separate openings 28 than does the potable water, which is described further below.

Figure 5:
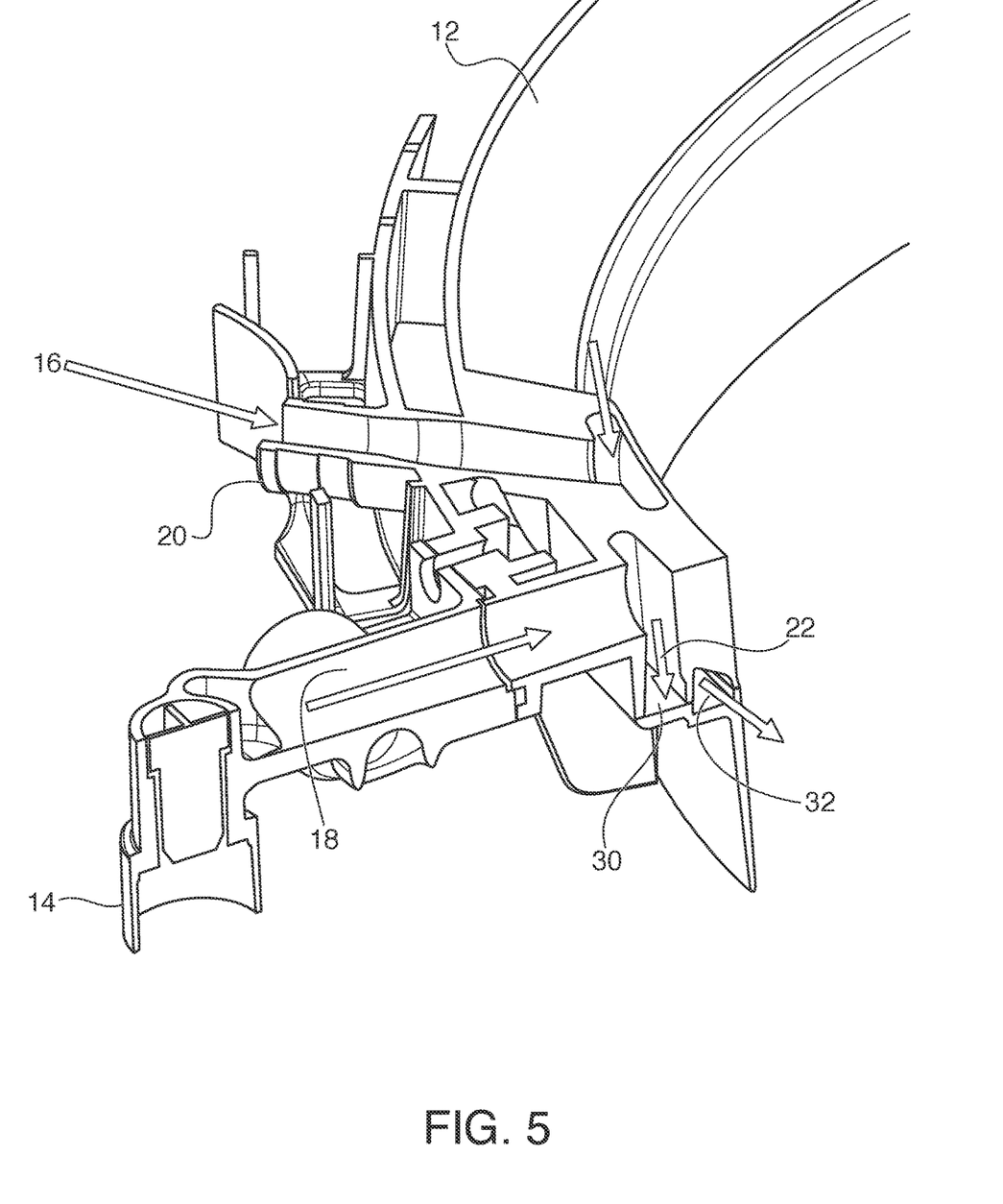
FIG. 5 shows a top cutaway perspective view of a dual channel rinse ring system.
Figure 6:
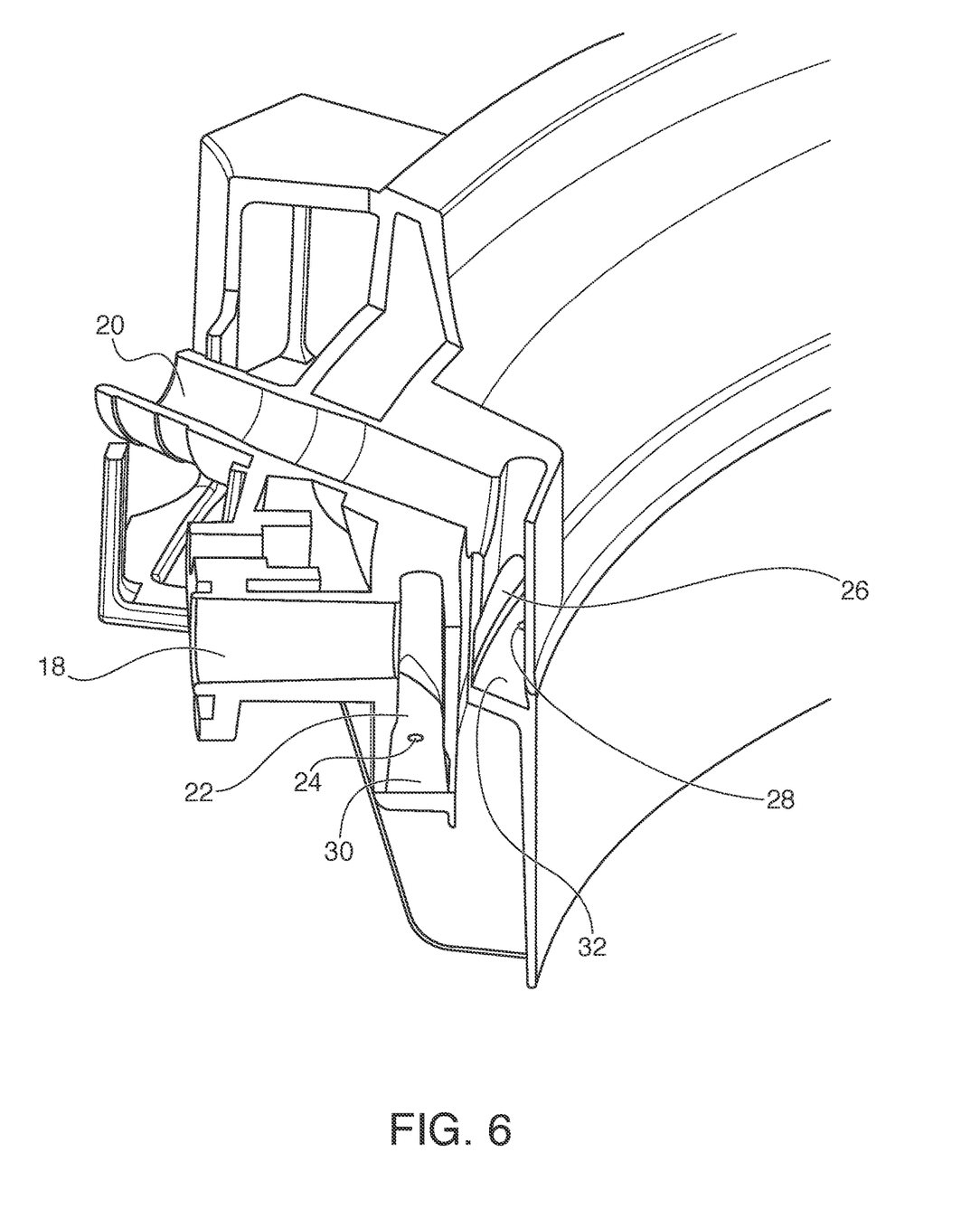
FIG. 6 shows a side cutaway perspective view of a dual channel rinse ring system.

FIG. 5 illustrates a sectional view of the rinse ring body 12. The first inlet 14 (the potable water inlet) leads to a first channel 18. These first components are part of a first flush fluid delivery system. The second inlet 16 (the grey water inlet) leads to a second channel 20. These second components are part of a second flush fluid delivery system. The two separate dual channels 18, 20 are separate from one another. Separate channels 18, 20 are illustrated by FIG. 6. These dual channels help prevent the gray water (second flush fluid) from contacting the anti-siphon valve 110, which delivers the first flush fluid.

The first inlet 14 and the first channel 18 may have a structure that is similar to the traditional rinse ring system 100 described above and shown by FIGS. 1 and 2. As shown more fully by FIGS. 5 and 6, the first channel 18 may deliver water downwardly through a first vertical chute 22, where the water then travels horizontally along a first track 30 of the rinse ring body 12, exiting through a first set of a plurality of openings 24.

Reference will now be made to the second inlet 16 and the second channel 20. These components are part of the second flush fluid delivery system. The figures illustrate the second inlet 16 being located toward the rear 40 of the rinse ring body 12, adjacent the first inlet 14. The general intent is that the inlets 14, 16 be near the centerline of the rinse ring 12 so that the pressure of the water flowing through both channels 18, 20 can be similar to the other for a consistent flush, regardless of which type of water is used. In the figure shown, the inlets 14, 16 are positioned generally toward the rear 40 of the rinse ring body 12. When a spray of water is injected into the dual channel rinse ring system 10, it is generally desirable that the pressure of the water be sufficient that water can be distributed throughout the ring and exit through the openings. Separate sprays of water (whether injected into the first inlet 14 or the second inlet 16) should generally have a similar/symmetrical flow throughout the ring. This is one reason that it is beneficial to position the first inlet 14 and the second inlet 16 generally near one another.

The figures illustrate the second inlet 16 directing water toward the rinse ring body 12 in a generally horizontal direction along the second channel 20. Although shown as generally horizontal, it is also possible for the second channel 20 to be angled with respect the rinse ring, such that water is delivered downwardly in order to use gravity for delivery. The figures also show the second channel 20 in nonparallel relation with respect to the first channel 18. This angle may be provided in order to maneuver the space at the back of the toilet and may be a design consideration. It is also possible for the second channel 20 to be parallel with the first channel 18. After the end of the length of the second channel, the second channel 20 may deliver water downwardly through a second vertical chute 26, where the water then travels horizontally along the rinse ring body 12, exiting through a second set of a plurality of openings 28.

Figure 7:
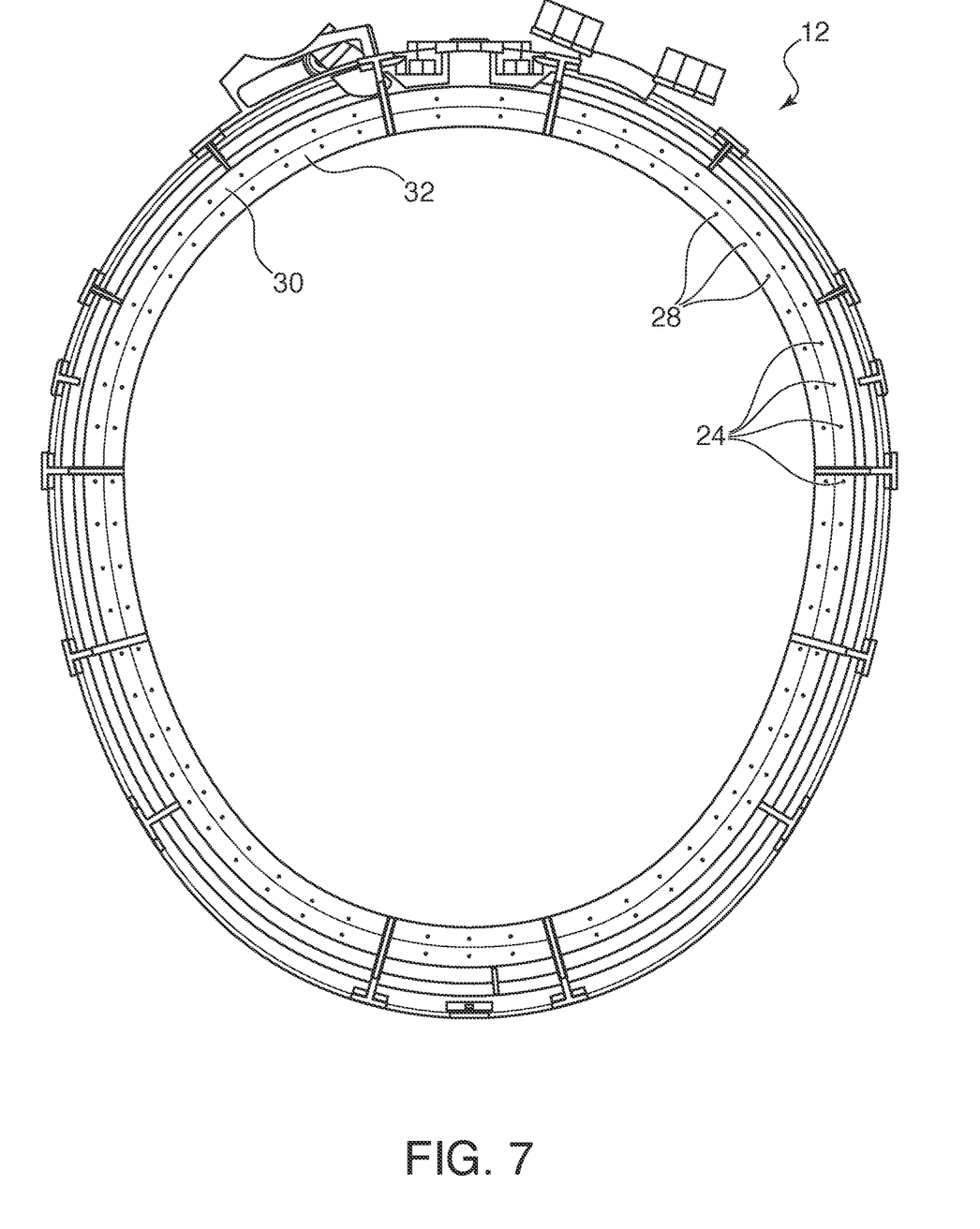
FIG. 7 shows a bottom plan view of a dual channel rinse ring system.

FIG. 7 illustrates a lower plan view of the rinse ring body 12. This figure shows the first set of openings 24 through which the potable water exits, and the second set of openings 28 through which the grey water exits. The first set of openings 24 is in fluid communication with a first track 30, which functions as a potable water (or first flush fluid) track. The second set of openings 28 is in fluid communication with a second track 32, which functions as a grey water (or second flush fluid) track. Similar to the first and second channels 18, 20, the first and second tracks 30, 32 remain separate and distinct from one another. They continue separately along the rinse ring body 12, preventing the different flush fluids contained therein from mixing. Although the first track 30 is shown as the external track and the second track 32 is shown as the internal track, these positions may be switched. The general goal is that the fluid flowing in the first track 30 does not come into communication with components of the second flush fluid delivery system; fluid flowing in the second track 32 does not come into communication with components of the first flush fluid delivery system. Additionally, fluid flowing through the different tracks do not come into fluid communication with one another, even as the different fluids are both flowing through the tracks 30, 32 at the same time. (Fluids may contact one another once they are injected or sprayed into the toilet bowl.) FIGS. 5 and 6 illustrate how the first and second tracks 30, 32 are fluidly disconnected from one another.

In one embodiment, the second set of openings 28 is sized differently than the first set of openings 24. For example, grey water may have various particulates contained herein, and providing a larger opening 28 on the second track 32 (the grey fluid track) can help ensure that the water exits the second set of openings 28 at the desired rate. The shape of the openings 24, 28 may be rounded, circular, oval, slit shaped, square, rectangular, triangular, or any other appropriate shape. The primary driver for the shape of the openings is manufacturing restraints. It is also desirable to optimize the spray out of the openings so that as much water as possible is forced out of the openings.

Although the second inlet 16, second channel 20, and second track 32 have been described primarily with respect to delivering grey water to the toilet, it is also possible for other fluids to be delivered along this second set. Non-limiting examples include but are not limited to detergents, anti-bacterial, cleaners, soapy water, bleach, or any other appropriate fluids.

Although described herein primarily with respect to toilet flushing technology, it is also possible to use the disclosed dual channel rinse ring for other flush applications. For example, the disclosed dual channel rinse ring may be used in connection with a bidet (one example of which is disclosed by U.S. Pat. No. 10,227,765 ("Bidet Rinse Ring"). The disclosed dual channel rinse ring may be used in connection with a galley sink that is designed to flush rather than drain, such that grey water is delivered to an onboard waste tank rather than to a drain mast (examples of which are disclosed by U.S. Pat. Nos. 10,221,548 and 10,266,268 (both titled "Integrated Sink and Disposal Unit"). These disclosed technologies may use a dual channel rinse ring in order to deliver a first rinse with fresh water (or with grey water for the galley sink application), and a second rinse with any type of appropriate cleaning fluid to clean out the bowl or other container.

The general goal of providing this dual channel rinse ring system as disclosed is to prevent cross-contamination between the two different types of liquids being delivered to the toilet.

The subject matter of certain embodiments of this disclosure is described with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

It should be understood that different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A dual channel rinse ring system, comprising:
a rinse ring body, the rinse ring body comprising:
  (a) first flush fluid delivery system comprising a first inlet that delivers a first flush fluid to a first channel, which delivers the first flush fluid to a first fluid track of the rinse ring body; and
  (b) a second flush fluid delivery system comprising a second inlet that delivers a second flush fluid to a second channel, which delivers the second flush fluid to a second fluid track of the rinse ring body, wherein the second flush fluid is different from the first flush fluid,
  wherein the first inlet, first channel, and first fluid track are fluidly isolated from the second inlet, the second channel, and the second fluid track, and
  wherein both the first and second flush fluid delivery systems deliver flush fluid to a toilet bowl.

2. The system of claim 1, wherein fluid separation prevents the first flush fluid from contacting the second flush fluid delivery system and prevents the second flush fluid from contacting the first fluid delivery system upstream from the first flush fluid inlet and the second flush fluid inlet.

3. The system of claim 1, wherein the first flush fluid comprises potable water.

4. The system of claim 1, wherein the second flush fluid comprises grey water.

5. The system of claim 1, wherein either the first flush fluid or the second flush fluid comprises detergents, antibacterial, cleaners, soapy water, or bleach.

6. The system of claim 1, wherein the first channel delivers the first flush fluid down a first vertical chute, which leads to first fluid track.

7. The system of claim 1, wherein the second channel delivers the second flush fluid down a second vertical chute, which leads to second fluid track.

8. The system of claim 1, further comprising a first set of openings in the first fluid track and a second set of openings in the second fluid track.

9. The system of claim 1, wherein the first fluid delivery system comprises an anti-siphon valve, and wherein the second flush fluid is never allowed to be in fluid contact with the anti-siphon valve.

10. The system of claim 1, wherein the rinse ring is installed on a vacuum toilet, a bidet, or on a galley flush sink.

11. A method for delivering two separate flush fluids to a toilet, the method comprising:
providing the dual channel rinse ring system of claim 1; and
  (a) delivering the first flush fluid into the first flush fluid delivery system; or
  (b) delivering the second flush fluid into the second flush fluid delivery system; or both (a) and (b).

* * * * *